(12) United States Patent
Knight

(10) Patent No.: US 6,810,792 B1
(45) Date of Patent: Nov. 2, 2004

(54) BARBECUE OVEN HAVING IMPROVED HEAT CIRCULATION

(75) Inventor: David B. Knight, Cape Girardeau, MO (US)

(73) Assignee: David B. Knight & Associates, Inc., Cape Girardeau, MO (US)

( * ) Notice: Subject to any disclaimer, the term of this patent is extended or adjusted under 35 U.S.C. 154(b) by 0 days.

(21) Appl. No.: 10/738,020

(22) Filed: Dec. 17, 2003

(51) Int. Cl.⁷ .............. A23L 1/00; A47J 37/00; A47J 37/04; A47J 37/07; A21B 1/00
(52) U.S. Cl. .............. 99/340; 99/427; 99/450; 99/482
(58) Field of Search ............... 99/339, 340, 386, 99/426, 427, 444–450, 481, 482, 443 C, 400, 401, 443 R, 477–479, 467; 126/21 A, 21 R, 25 R, 41 A, 41 R, 59.5, 299 R, 369; 55/440, 444, 521; 426/523, 314, 474; 219/388, 400

(56) References Cited

U.S. PATENT DOCUMENTS

| | | |
|---|---|---|
| 2,510,856 A | 6/1950 | Bettencourt |
| 2,558,569 A | 6/1951 | Koch |
| 2,833,201 A | 5/1958 | Simank |
| 2,956,497 A | 10/1960 | Bernstein |

(List continued on next page.)

*Primary Examiner*—Timothy F. Simone
(74) *Attorney, Agent, or Firm*—Senniger Powers

(57) ABSTRACT

A barbecue oven having an internal firewall separating a cooking chamber and a fire chamber. The firewall has a generally arcuate shape that forms an upwardly tapered duct connecting the fire chamber to the cooking chamber along an interior wall. As configured, the cooking chamber has a generally elliptical shape that promotes the recirculating of the heat and smoke within the cooking chamber. The constricted throat of the aperture creates an accelerated current of heat and smoke directed into the cooking chamber. The heat and smoke is directed up the rear wall, then passes across the top of the cooking chamber, down the front, and is then entrained in the current from the fire chamber. Thereafter, the heat and smoke exit the cooking chamber through portals opening into exhaust ducts contained within the sidewalls. Electric heating elements are placed adjacent to an elevated, elongated vessel containing the solid fuel such as wood or charcoal. The heating elements heat the solid fuel until the fuel begins to smolder. Once the fuel begins to smolder, a blower forces air through the solid fuel to create ignition of the fuel.

38 Claims, 4 Drawing Sheets

U.S. PATENT DOCUMENTS

| | | | |
|---|---|---|---|
| 3,221,729 A | | 12/1965 | Beasley et al. |
| 3,384,068 A | | 5/1968 | Perry et al. |
| 3,504,620 A | * | 4/1970 | Gerhardt ................ 99/427 |
| 3,524,403 A | * | 8/1970 | Johnson et al. ........... 99/331 |
| 3,593,647 A | * | 7/1971 | Copeland, Jr. ............ 99/339 |
| 3,782,892 A | | 1/1974 | Johnson et al. |
| 3,812,837 A | | 5/1974 | Takase |
| 3,817,166 A | | 6/1974 | McLain |
| 3,841,211 A | | 10/1974 | Ellis |
| 3,868,943 A | | 3/1975 | Hottenroth et al. |
| 4,130,052 A | | 12/1978 | Jacobson |
| 4,300,523 A | | 11/1981 | Robertson et al. |
| 4,307,659 A | | 12/1981 | Martin et al. |
| 4,355,570 A | | 10/1982 | Martin et al. |
| 4,454,827 A | | 6/1984 | Smith et al. |
| 4,467,709 A | * | 8/1984 | Anstedt ................... 99/482 |
| 4,470,343 A | * | 9/1984 | Didier .................... 99/427 |
| 4,475,533 A | | 10/1984 | Milligan |
| 4,957,039 A | * | 9/1990 | Reyes ..................... 99/340 |
| 4,962,697 A | * | 10/1990 | Farrar .................... 99/340 |
| 4,984,557 A | | 1/1991 | König |
| 5,154,159 A | | 10/1992 | Knafelc et al. |
| 5,176,124 A | | 1/1993 | Wrasse |
| 5,205,273 A | | 4/1993 | Sparks et al. |
| 5,460,159 A | * | 10/1995 | Bussey ................... 126/25 R |
| 5,515,774 A | * | 5/1996 | Swisher et al. ........... 99/340 |
| 5,598,769 A | | 2/1997 | Luebke et al. |
| 5,673,613 A | * | 10/1997 | Price ..................... 99/482 |
| 5,683,604 A | | 11/1997 | Ubert et al. |
| 5,752,497 A | | 5/1998 | Combs et al. |
| 5,913,967 A | * | 6/1999 | Eisele .................... 99/468 |
| 5,996,572 A | | 12/1999 | Hagan |
| 6,035,770 A | | 3/2000 | Whitefield |
| 6,038,964 A | * | 3/2000 | Sikes ..................... 99/340 |
| 6,060,701 A | | 5/2000 | McKee et al. |
| 6,131,559 A | | 10/2000 | Norris et al. |
| 6,142,066 A | | 11/2000 | Anders et al. |
| 6,644,178 B2 | * | 11/2003 | Clark ..................... 99/482 |

* cited by examiner

BARBECUE OVEN HAVING IMPROVED HEAT CIRCULATION

BACKGROUND OF THE INVENTION

This invention relates generally to barbecue ovens, and in particular to a barbecue oven having improved heat and smoke flow.

Barbecuing is a traditional cooking process that typically involves the cooking of foods by exposing them to relatively low temperature smoke for a number of hours. The structure used for barbecuing typically includes a heating or fire chamber, a cooking chamber and a conduit or flue through which smoke and heated combustion gases are transported from the fire chamber to the cooking chamber. Smoke and heat is produced by burning a smoke producing substance in the fire chamber such as wood, which is periodically replenished, until cooking is completed. The fire chamber is traditionally located to the side of the cooking chamber because grease often drips from the food being cooked. If the grease contacts the burning fuel, it could ignite. Typically, blowers or fans in the cooking chamber circulate the heated air and smoke from the fire chamber around the food to heat the food and impart a smokey flavor.

SUMMARY OF THE INVENTION

Among the several objects of this invention may be noted the provision of a barbecue oven that efficiently circulates heated air and smoke around the food; the provision of such a barbecue oven which can circulate heated air and smoke without a blower or other driver within the cooking chamber for moving the heat and smoke; the provision of such a barbecue oven which provides a heated air directing device that is adaptable to various sizes of barbecue ovens; the provision of such a barbecue oven which is practical to use in either an indoor or outdoor environment.

A barbecue oven of the present invention for cooking foods. The barbecue oven includes a housing, a cooking chamber in the housing sized and shaped for receiving food therein to be cooked, a fire chamber in the housing sized and shaped for receiving combustible material therein to generate heat and smoke for cooking the food. The barbecue oven also includes a firewall separating the fire chamber and the cooking chamber and a duct having a first end opening into the fire chamber and a second end opening into the cooking chamber. The duct tapers in a cross sectional area from the fire chamber to the cooking chamber such that heated smoke and air from the fire chamber accelerate from the second end of the duct into the cooking chamber for circulation within the cooking chamber.

In another aspect, the invention is a barbecue oven for cooking foods. The barbecue oven comprises a housing including at least one vertical wall, a top wall and a bottom wall. A cooking chamber in the housing is sized and shaped for receiving food therein to be cooked, and a fire chamber in the housing sized and shaped for receiving combustible material therein to generate heated air and smoke for cooking the food. A firewall separates the fire chamber and the cooking chamber. A duct extends between the fire chamber and cooking chamber for providing fluid communication therebetween, the firewall generally defining a bottom of the cooking chamber and having a trough configuration opening upwardly into the cooking chamber to promote circulation of heated air and smoke within the cooking chamber.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENT

Figure 1:
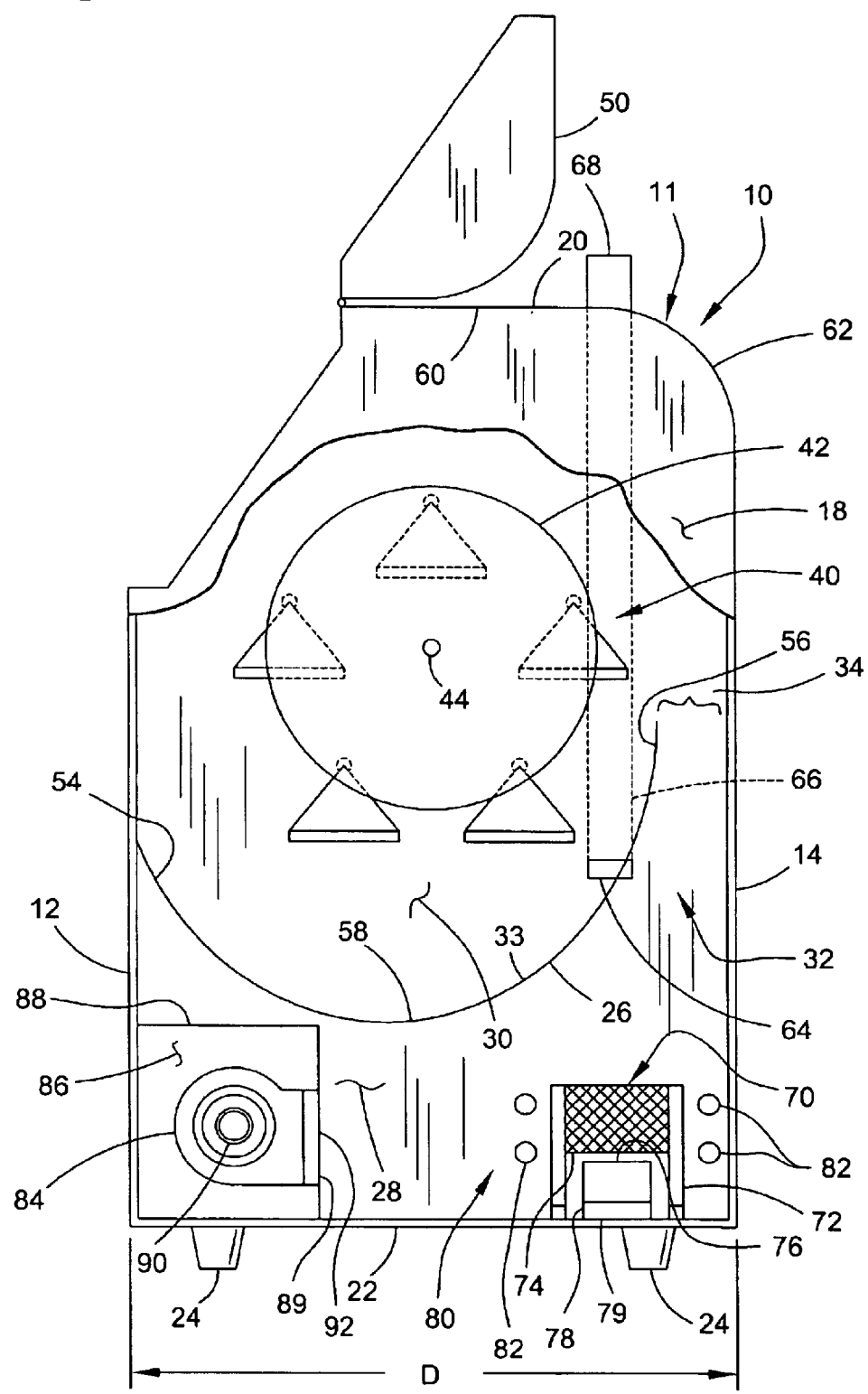
FIG. 1 is a side elevation of a barbecue oven with a side wall broken away to show internal construction.
Figure 2:
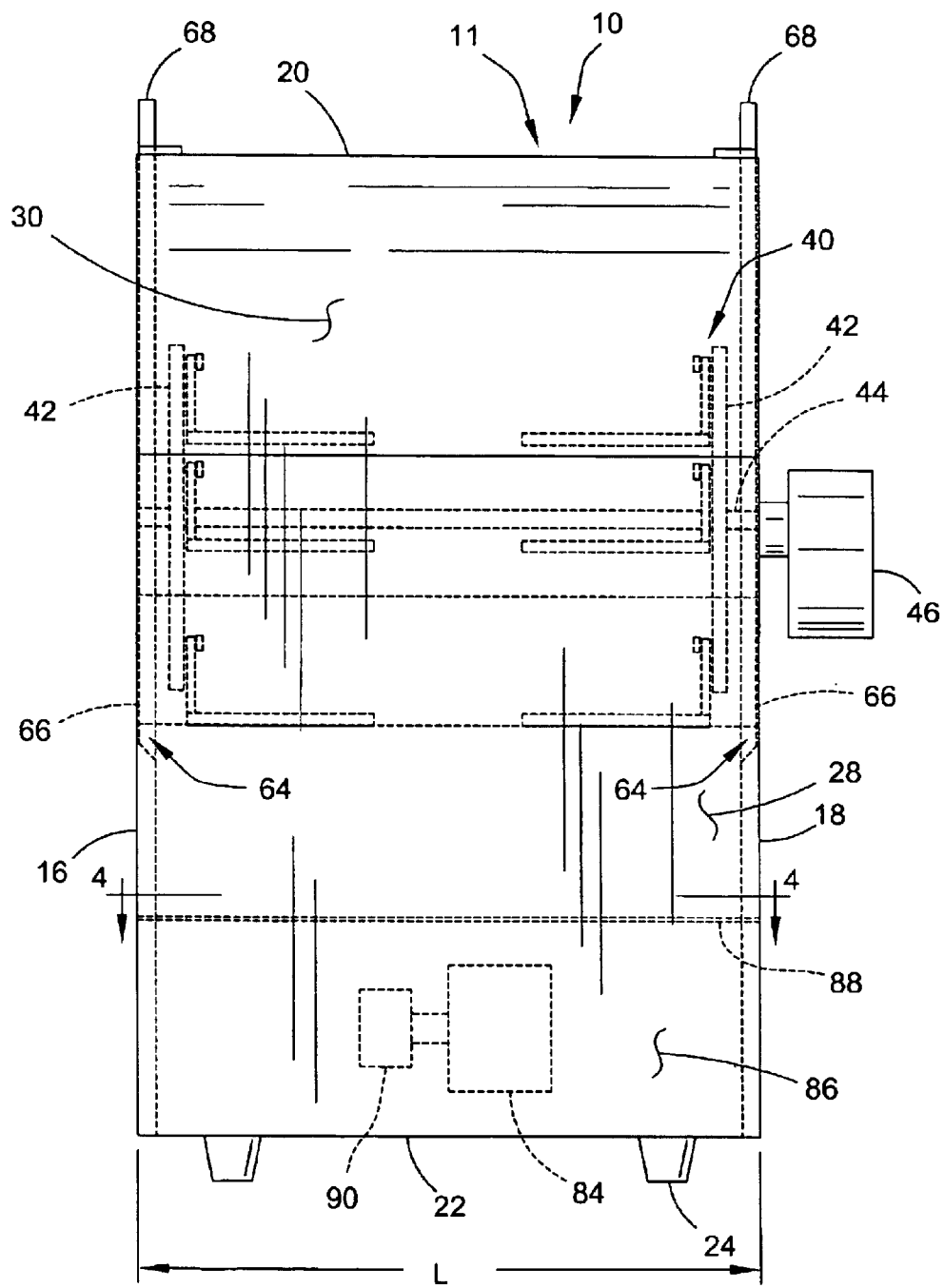
FIG. 2 is a front elevation of the barbecue oven of FIG. 1.
Figure 3:
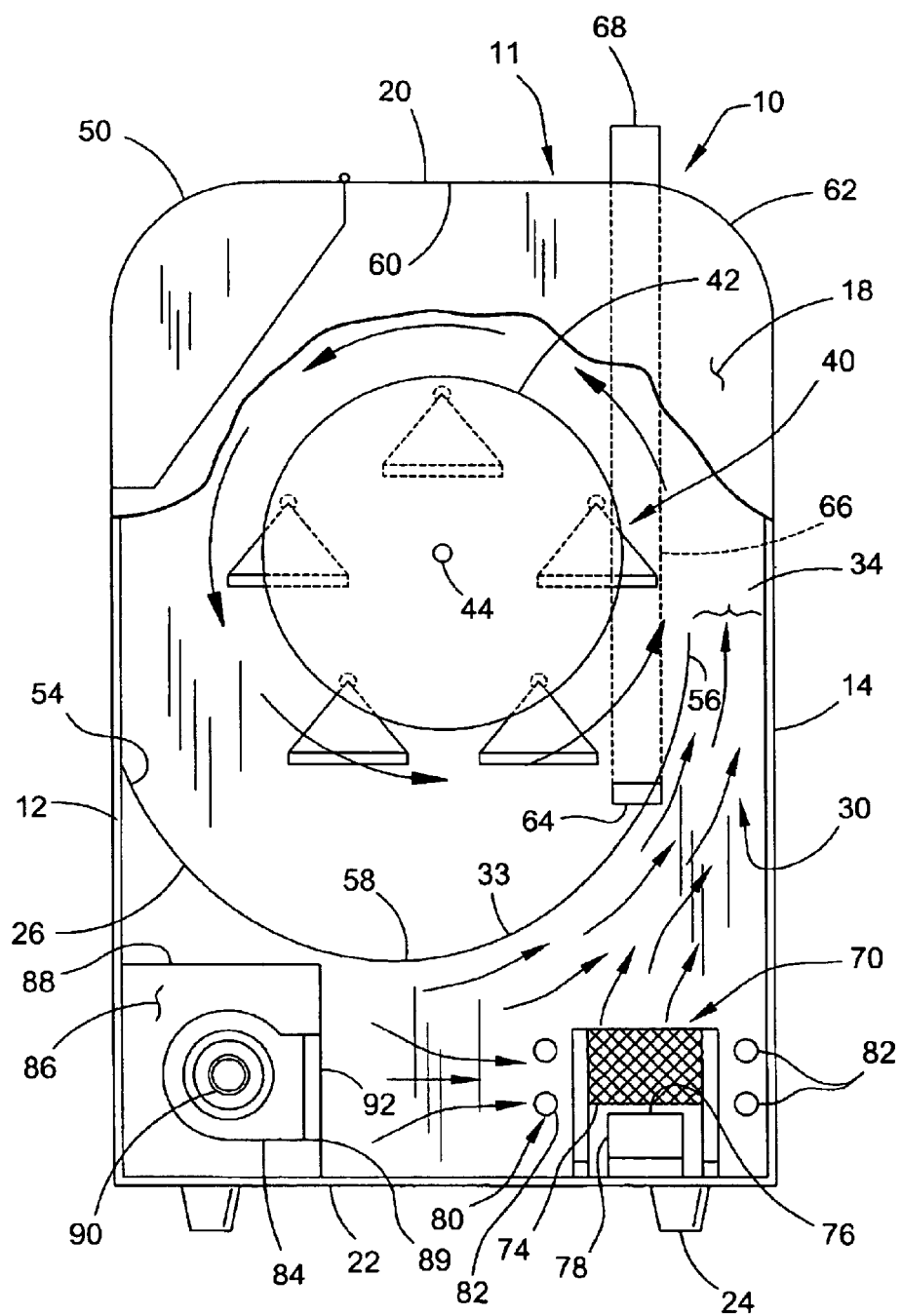
FIG. 3 is a side elevation similar to FIG. 1 illustrating a circulation flow path of heated air and smoke in the oven.

Referring now to the drawings and in particular to FIGS. 1–3, a barbecue oven that efficiently circulates heat and smoke around the food to be cooked is designated generally by reference numeral 10. For purposes of illustration, the invention will be described in conjunction with a barbecue oven. However, the invention should not be limited to this specific use, as it is instead intended that the invention be used in any application in which circulation of heated air around food is to be employed. The oven 10 includes a housing, indicated generally at 11 which comprises a front wall 12, a back wall 14, side walls 16 and 18, a top 20 and a bottom 22. The front, back and side walls 12, 14, 16, 18, constitute wall members which together form vertical walls of the housing 11. The number of wall members forming the vertical wall may be other than described without departing from the scope of the present invention. The housing 11 is supported by legs 24 extending from the bottom 22 to position the oven 10 above an underlying floor F. Alternately, wheels (not shown) or a combination of legs 24 and wheels may be used to facilitate transport of the barbecue oven. The housing 11 is suitably constructed of heat resistant materials such as stainless steel. However, other metals or porcelain coated materials suitable for use in cooking ovens can also be utilized. The housing may have draft portals (not shown), such as in one or both of the sidewall 16, 18. The barbecue oven 10 may also include insulation material in various parts thereof to maintain temperatures in the oven and to protect users from heat generated by burning fuel in the oven. Insulation may comprise a double-wall construction of the walls 12, 14, 16, 18 20 and 22 thereof. The double-wall structure may include insulating material between the walls, such as high-temperature mineral wool or other non-combustible material.

A heat flow regulating firewall 26 divides the interior of the oven 10 into a fire chamber 28 and a cooking chamber 30. In one embodiment, the firewall 26 extends between the opposite side walls 16, 18 along a length L of the oven 10 and extends from the front wall 12 to near the back wall 14 along a depth D of the oven. The fire chamber 28 is in the lower part of the oven beneath the firewall and the cooking chamber 30 is above the firewall. Thus, the oven 10 has a generally vertical orientation, with the cooking chamber 30 located above the fire chamber 28. The firewall 26 has a generally arcuate shape with a rear portion 33 that extends upward to form a tapered duct 32 having a throat 34, broadly a second end or outlet, between the firewall and the rear wall 14. The duct 32 is defined by the rear portion 33 of the firewall 26, a portion of the rear wall 14 generally opposing the rear portion and sections of the side walls 16, 18 extending between the rear portion and opposing portions of the rear wall. A first end or inlet of the duct 32 is located in a horizontal plane between the lowest point of the firewall 26 and the rear wall 18. Heated air and smoke from the fire chamber 28 pass through the throat 34 to the cooking chamber 30, as will be more fully described below. The shape of the firewall 26 may be described as a segment of an ellipse (see FIG. 1). One or more flanges (not shown) extending from the firewall 26 to the back wall 14 may secure the firewall to the back wall without substantially blocking the aperture 34. The firewall 26 is fixed to the front wall 12 and the side walls 16, 18 of the housing 11 such as by welding. However, the firewall 26 can be fixed to the housing 11 using suitable brackets and fasteners (not shown) without departing from the scope of the invention.

A food rack, indicated generally at 40, is located within the cooking chamber 30. As shown, the food rack 40 includes rotisserie wheels 42 and a rotisserie shaft 44 extending through openings 45 in the side walls 16, 18. The rotisserie shaft 44 is rotated by an electric motor 46 or other suitable motor. The rotisserie shaft 44 may be adjustable in height through guides (not shown) within the side walls 16, 18 of the housing 11. Those of ordinary skill in the art will readily appreciate the construction and operation of rotisserie-type food racks. Accordingly, additional details of construction and operation of the food rack 40 will not be described herein. Generally speaking, the food rack 40 may have various configurations (not shown), including rotating spits, shelves, baskets, or can even have stationary or sliding shelves without departing from the scope of the invention.

A lid or door 50 (shown in the open position in FIG. 1) makes up a portion of the front wall 12 and the top 20 of the housing 11 and provides access to the cooking chamber 30. The door 50 may have a heat resistant glass window (not shown) located therein to allow the user to monitor the food product being cooked without having to open the door. Also located on the door 50 may be a thermometer (not shown) that indicates the temperature inside the oven 10 to aid in regulating the fire in the fire chamber 28. During operation of the oven 10, the door 50 is typically in a closed position except when inserting food or retrieving food from the oven 10.

In one embodiment of the invention, the firewall 26 is shaped with a front edge 54 and back edge 56 thereof located vertically higher in the oven 10 than a middle portion 58 such that the firewall has a concave or trough shape opening upward toward the cooking chamber 30. The position of the firewall 26 below the food rack 40 permits the firewall to act as a drip pan for catching grease and other meat drippings produced by food while cooking on the cooking racks 40. Desirably, the throat 34 is located at a level vertically above a bottom portion of the food rack 40.

The shape of the firewall 26 also influences the circulation of heated air and smoke within the oven 10. As best seen in FIG. 1, the arcuate firewall 26 forms a front boundary of the tapered duct 32 that extends upwardly from the fire chamber 28 to the cooking chamber 30 through which hot air and smoke can flow from the fire chamber. The lower, wider portion of the tapered duct 32 funnels heated air and smoke from the fire chamber into the duct and creates an accelerated laminar current of heated air and smoke directed into the cooking chamber 30 through the constricted throat 34. The width of the throat 34 at the narrowest portion of the tapered duct 32 is between about 2 percent and about 30 percent of the depth D of the barbecue oven, and more suitably between about 5 percent and about 15 percent of the depth D. Stated another way, in the illustrated embodiment the narrowest portion of the tapered duct 32 has a width that is between about 1 inch and about 8 inches wide, and more suitably between about 2 inches and about 5 inches wide.

As configured, the top 20 of the housing 11 has a generally flat section 60 and curved ends 62 joining the front and back walls 12, 14. The curved shape of ends 62 give the top of the enclosure 11 a generally concave shape opening downward toward the cooking chamber 30. The curved shape of the transition between the top 20 and front and back walls 12, 14 also influences the circulation of heated air and smoke within the oven 10 by reducing the accumulation of stagnant pockets of air in the cooking chamber. In one suitable embodiment, each curved end 62 has a radius of curvature of about 9 inches in an oven 10 with a total depth D of about 36 inches. Other radii of curvature and sizes of ovens 10 are contemplated. The curved ends 62 at the top 20 of the housing 11, in conjunction with the concave shape of the firewall 26, give the cooking chamber 30 a roughly elliptical shape in longitudinal cross-section (FIGS. 1 and 3) that promotes the circulation of the heat and smoke within the cooking chamber. An even more elliptical shape of the cooking chamber 30 is contemplated. The heated air and smoke in the cooking chamber 30 circulate in a generally circular or elliptical path around the food products on the food rack 40, flowing up the rear wall 14, across the top 20 of the cooking chamber, down the front wall 12, and over the fire wall 26. The accelerated current of heated air and smoke passing through the throat 34 of the tapered duct 32 entrains the air in the cooking chamber 30 to provide momentum and to keep the air circulating in this circular pattern. The accelerated heated air stream flowing through the tapered duct 32 reduces heat stratification in the cooking chamber 30, even when there is no artificial means to circulate the air within the cooking chamber. Thus, this circulation path within the oven 10 is configured to eliminate the need for baffles, flues or convection fan blades located in the cooking chamber 30 for distributing the heated air around the food products being cooked.

In one embodiment, smoke exits the cooking chamber 30 through one or more portals 64 located in the sidewalls 16, 18 of the housing. The portals 64 serve as openings into exhaust ducts 66 contained within the sidewalls 16, 18. Desirably, the portals 64 are located in the sidewalls 16, 18 so that the portals are below the bottom-most portion of the food rack 40. This location of the portals 64 facilitates removal of smoke in an amount and rate which promotes circulation of smoke and maintenance of smoldering solid fuel in the fire chamber 28. Thus, food in the oven is properly flavored by the smoke without being over-exposed to the smoke. The exhaust ducts 66 desirably have a bottom surface that slopes upward from the interior surface of the sidewall to the outward surface of the exhaust duct so that any grease splattering into the portals 64 is discouraged from accumulating in the ducts. The exhaust ducts 66 are suitably about 4 inches wide and about ¾ of an inch deep and form a conduit leading to exhaust stacks 68 near the top 20 of the oven which can be open to the atmosphere or connected to a suitable chimney. The exhaust stacks 68 extend from the housing 11 above the sidewalls 16, 18 so as to not interfere with the door 50. Ambient heat in the cooking chamber 30 is transferred through the side wall 16, 18 to the confined space in the exhaust duct 66 to aid in transporting the smoke. When heated, the exhaust ducts 66 transport heat and smoke through the exhaust stacks 68 to the atmosphere, promoting the circulation of the smoke and heat within the cooking chamber 30. Other means for venting smoke from the cooking chamber 30 are contemplated without departing from the scope of the invention.

Figure 4:
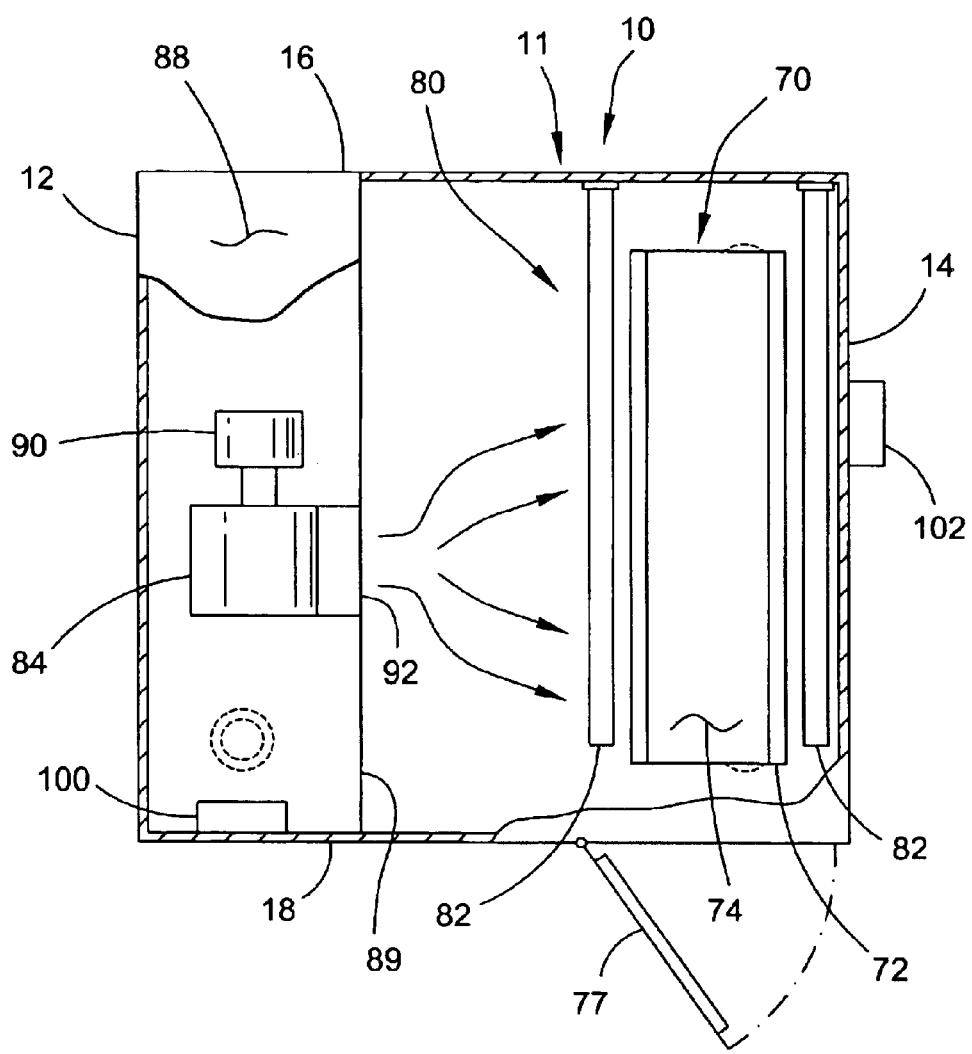
FIG. 4 is a section taken in the plane including line 4—4 of FIG. 2.

The fire chamber 28 contains a solid fuel vessel, broadly a heat source, generally indicated at 70. The solid fuel vessel 70 holds combustible material such as wood logs, wood chips, lump charcoal, compressed charcoal, wood pellets, and the like. The heat source 70 can also be an electric heating source without departing from the scope of the invention. In such case, the fuel vessel 70 may contain a relatively small quantity of a smoke producing material such as hickory wood. The vessel 70 includes downwardly extending side walls 72 that engage the bottom 22 of the housing 11 to maintain the vessel 70 in its proper position and a substantially planar vessel bottom 74. As best seen in FIG. 4, the vessel 70 is suitably elongated in shape spanning nearly the entire length L of the oven 10. Beneath the solid fuel vessel 70 is a removable ash tray 76 for collecting expended ash material. The ash tray 76 includes a substantially horizontal planar bottom member 78 and side walls 79 extending upwardly from the bottom member for receiving and containing ashes. The ash tray 76 is suitably removable through a side door 77 for convenient emptying of the ash.

In one embodiment, the barbecue oven 10 includes an ignition device, indicated generally at 80, for igniting the solid fuel. The ignition device 80 desirably ignites the solid fuel without the use of gas or other lighter fluids and sparks, such as a standing or intermittent pilot light. The introduction of lighter fluids can introduce undesirable flavors when used for barbecue cooking. The ignition device 80 includes one or more electric heating elements 82 placed adjacent to the vessel 70 containing the solid fuel and a blower 84 that forces air around the solid fuel to improve combustion of the fuel. The heating element 82 are suitably rod-shaped and are positioned substantially parallel with the elongated vessel 70 containing the solid fuel. In one embodiment, the heating elements 82 are conventional cal rod type resistive heating elements such as, for example, Chromolux Model TRI-54XX, 240V. However, these heating elements 82 are only exemplary of suitable heating elements and one skilled in the art will understand that other heating elements may be used without departing from the scope of the invention. The heating element 82 are electrically connected to a suitable power source. The heating elements 82 are desirably placed along side the vessel 70 so that the amount of ash created during combustion and consumption of the solid fuel that comes in contact with the heating elements is reduced. A reflector (not shown) may be placed adjacent the heating elements 82 and outward from the vessel 70 to reflect the radiated heat toward the vessel.

The blower 84 is located in a compartment 86 that: abuts the front wall 12 of the housing 11 in the heating chamber 28. The compartment 86 comprises a top wall 88 and side walls 89. The blower 84 has a motor 90 which directs air through an opening 92 in the side wall 89, past the heating elements 82, and through the side walls 72 of the solid fuel vessel 70. The blower motor 90 can be an electric motor capable of operating at various speeds. The blower 84 can also be a gas-fired power burner configured to burn natural gas, LP gas, or other fuel to provide a heat source without departing from the scope of the invention. In such embodiments, the blower 84 is adapted to produce a flame extending through the opening 92 in the compartment 86 toward the vessel 70.

In use, the heating elements 82 heat the solid fuel until the fuel begins to smolder. Once the solid fuel begins to smolder, as indicated by a rise in temperature in the cooking chamber 30 to a determined range, suitably between about 200 degrees F. and about 250 degrees F., the blower 84 forces air through the solid fuel to create ignition of the fuel. The side walls 72 allow air to pass through the vessel 70 for faster and more complete ignition of the fuel. After ignition occurs, the blower 84 acts as a bellows to rapidly kindle the solid fuel.

In one embodiment, a thermostat 100, broadly a controller, is mounted on the housing 11 and is connected with the heating elements 82 and the blower motor 90 by electrical wiring and controls (not shown) in a conventional manner. The thermostat 100 is adjusted to maintain a desired temperature within the cooking chamber 30 by controlling the current flowing to the heating elements 82 and the blower 84. A thermocouple 102, broadly a temperature sensor, is mounted on the housing 11 and provides temperature input to the thermostat 100. The thermostat 100 may be a conventional thermostat such as a Robertshaw 5300-17E and may use simple logic or may receive input from additional thermocouples (not shown) and use staged or sequenced logic. When the desired temperature is achieved, (suitably between about 200 degrees F. and about 250 degrees F., the thermostat 100 automatically turns off the heating elements 82 and the blower 84. When the temperature in the cooking chamber 30 falls sufficiently below the desired temperature, such as to a range between about 5 F. degrees and about 10 F. degrees, the thermostat 100 reenergizes the heating elements 82 and the blower 84, thus reestablishing combustion in the solid fuel and restoring the desired temperature. In this manner, the thermostat 100 controls the heating elements 82 and the blower 84 to restore combustion of the fuel and maintain the air temperature within the oven 10 within a predetermined range.

The embodiments presented herein provide an improved and efficient means for circulating heat and smoke around the food to be cooked in a barbecue oven for use at home or in a restaurant environment.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A barbecue oven for cooking foods comprising a housing, a cooking chamber in the housing sized and shaped for receiving food therein to be cooked, a fire chamber in the housing sized and shaped for receiving combustible material therein to generate heat and smoke for cooking the food, a firewall separating the fire chamber and the cooking chamber and a duct having a first end opening into the fire chamber and a second end opening into the cooking chamber, the duct tapering in a cross sectional area from the fire chamber to the cooking chamber such that heated smoke and air from the fire chamber accelerate from the second end of the duct into the cooking chamber for circulation within the cooking chamber.

2. A barbecue oven according to claim 1 wherein the fire chamber is arranged generally below the cooking chamber.

3. A barbecue oven according to claim 2 wherein the duct is at least partially defined by the fire wall.

4. A barbecue oven according to claim 3 wherein the duct is defined by the fire wall and at least one wall of the housing, the firewall being disposed closer to but spaced from said one wall of the housing at said second end of the duct and being spaced farther from said one wall of the housing at said first end of the duct.

5. A barbecue oven according to claim 4 wherein the cooking chamber has an interior width and the second end of the duct has a width which is less than about 10 percent of the width of the cooking chamber.

6. A barbecue oven according to claim 5 wherein said one wall has an interior lateral length and the second opening of the duct extends substantially the full lateral interior length of said one wall.

7. A barbecue oven according to claim 4 wherein the firewall is curved.

8. A barbecue oven according to claim 7 wherein the firewall has a shape of a segment of an ellipse and has a generally trough configuration opening upwardly to the cooking chamber.

9. A barbecue oven according to claim 7 wherein the taper of the duct is formed by the elliptical curvature of the firewall.

10. A barbecue oven according to claim 8 wherein the housing is shaped to cooperate with the firewall in promoting a rotational flow of smoke and heated are within the cooking chamber.

11. A barbecue oven according to claim 10 wherein the housing includes a front wall, a top wall, a rear wall and side walls defining the cooking chamber, at least one of said walls being curved to promote the rotational flow of smoke and heated air.

12. A barbecue oven according to claim 1 further comprising a food rack mounted in the cooking chamber and having a bottom.

13. A barbecue oven according to claim 12 wherein the second end of the duct is located above the bottom of the food rack.

14. A barbecue oven according to claim 12 wherein the second end of the duct is offset from beneath the food rack.

15. A barbecue oven according to claim 12 wherein the food rack is a rotisserie.

16. A barbecue oven according to claim 15 wherein the rotisserie is positioned above the firewall such that drippings from food falls onto the firewall.

17. A barbecue oven according to claim 1 further comprising a fuel vessel in the fire chamber, an ignition device mounted adjacent to the fuel vessel, and a blower mounted on the housing for blowing air across the ignition device and into the fuel vessel to ignite combustible material in the vessel.

18. A barbecue oven according to claim 17 further wherein the ignition device comprises resistive heating elements.

19. A barbecue oven according to claim 18 wherein the ignition device further comprises a sensor and a controller, the controller being configured to turn on the blower when the sensor detects that combustible material in the fuel vessel is smoldering.

20. A barbecue oven according to claim 19 wherein the controller is configured to turn off the blower when the sensor detects that the combustible material is ignited.

21. A barbecue oven for cooking foods comprising a housing including at least one vertical wall, a top wall and a bottom wall, a cooking chamber in the housing sized and shaped for receiving food therein to be cooked, a fire chamber in the housing sized and shaped for receiving combustible material therein to generate heated air and smoke for cooking the food, a firewall separating the fire chamber and the cooking chamber, a duct extending between the fire chamber and cooking chamber for providing fluid communication therebetween, the firewall generally defining a bottom of the cooking chamber and having a trough configuration opening upwardly into the cooking chamber to promote circulation of heated air and smoke within the cooking chamber.

22. A barbecue oven according to claim 21 wherein the firewall has the shape in vertical section of a segment of an ellipse.

23. A barbecue oven according to claim 22 wherein the cooking chamber is further defined by a portion of the vertical wall and the top wall, at least one of the vertical wall and top wall being curved to cooperate with the firewall in promoting circulation of heated air and smoke within the cooking chamber in a generally elliptical path.

24. A barbecue oven according to claim 23 wherein the vertical wall comprises a front wall member, side wall members and a rear wall members, the top wall being curved at front and rear margins thereof.

25. A barbecue oven according to claim 24 wherein the top wall includes a flat section.

26. A barbecue oven according to claim 25 wherein the firewall extends generally between the side wall members and between the front and rear wall members and the fire chamber is located generally below the cooking chamber.

27. A barbecue oven according to claim 26 wherein the duct is shaped to accelerate heated air and smoke from the fire chamber into the cooking chamber generally adjacent the rear wall member of the housing to promote circulation of the heated air and smoke within the cooking chamber.

28. A barbecue oven according to claim 27 wherein the duct is defined at least in part by the firewall, the duct being formed by the elliptical curvature of the firewall to taper in cross sectional area from the fire chamber to the cooking chamber.

29. A barbecue oven according to claim 28 further comprising a food rack located in the cooking chamber, the duct having an outlet into the cooking chamber located at a position above a bottom of the food rack.

30. A barbecue oven according to claim 29 wherein the outlet of the duct is offset from beneath the food rack.

31. A barbecue oven according to claim 29 wherein the food rack is a rotisserie.

32. A barbecue oven according to claim 31 wherein the rotisserie is positioned above the firewall such that drippings from food falls onto the firewall.

33. A barbecue oven according to claim 21 further comprising a fuel vessel in the fire chamber, an ignition device mounted adjacent to the fuel vessel, and a blower mounted on the housing for blowing air across the ignition device and into the fuel vessel to ignite combustible material in the vessel.

34. A barbecue oven according to claim 33 further wherein the ignition device comprises resistive heating elements.

35. A barbecue oven according to claim 34 wherein the ignition device further comprises a sensor and a controller, the controller being configured to turn on the blower when the sensor detects that combustible material in the fuel vessel is smoldering.

36. A barbecue oven according to claim 35 wherein the controller is configured to turn off the blower when the sensor detects that the combustible material is ignited.

37. A barbecue oven according to claim 28 further comprising at least one portal in the side wall member leading to an exhaust duct contained within the side wall member through which smoke exits the cooking chamber.

38. A barbecue oven according to claim 37 wherein the portal is located below a bottom of the food rack.

* * * * *